J. V. Jepson.
Pipe Coupling.
No. 98,697.   Patented Jan. 4, 1870.

Witnesses.
Fred. Haynes.
J. W. Coombs.

Inventor.
John Owen Jepson

United States Patent Office.

JOHN VIVIAN JEPSON, OF BROOKLYN, NEW YORK.

Letters Patent No. 98,597, dated January 4, 1870; antedated December 24, 1869.

IMPROVEMENT IN PIPE-COUPLING.

The Schedule referred to in these Letters Patent and making part of the same.

*To all whom it may concern:*

Figure 1:
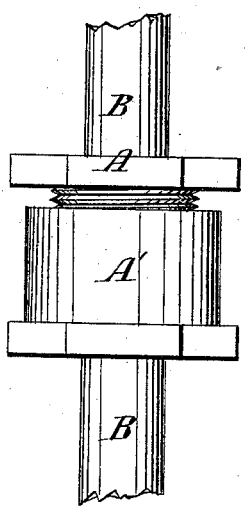
Figure 2:
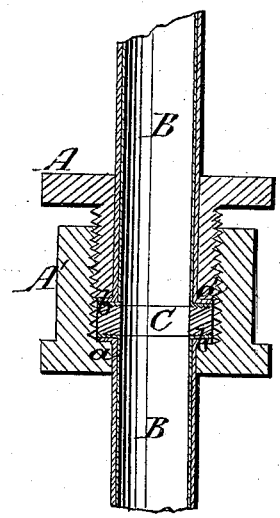

Be it known that I, JOHN VIVIAN JEPSON, of Brooklyn, in the county of Kings, and State of New York, have invented a new and improved Pipe-Coupling; and I do hereby declare that the following is a full, clear, and exact description of the same, reference being had to the accompanying drawings, forming a part of this specification, in which Figure 1 represents a longitudinal view of a pipe-coupling constructed according to my invention, and Figure 2 represents a longitudinal section of the same.

Similar letters of reference indicate corresponding parts in both figures.

This invention is especially designed for the coupling of lead pipe, and is intended to be used either for the coupling of pipes at points where frequent uncoupling may-be necessary, or as a substitute for soldered joints, some convenient and not too expensive substitute for which is especially desirable for tin-lined lead pipe, owing to the difficulty of making a perfect soldered joint without impairing the lining.

The invention consists in the construction of a pipe-coupling, having an interposed loose washer of hard metal, with annular grooves or corrugations on its faces, to be placed between the flanged extremities of the soft-metal pipe, and within the male and female screws of an universal coupling, whereby simplicity, efficiency, and cheapness are combined.

A A' is a male and female socket, fitted together by a screw-thread.

B B are the sections of pipe to be joined or coupled.

$b\ b$ are flanges provided upon the inner ends of the sections of pipe B B, and which engage, by means of their outer or near surfaces, with shoulders $a\ a'$ of the socket A A'.

C is a loose washer, interposed between the flanges $b\ b$ of the pipes B B, for the establishment of a close joint thereat.

Said washer C is provided with a central opening or hole, $c$, the size of the calibre of the pipe, and also with annular corrugations upon its sides, for the more perfect engagement thereof with the flanges $b\ b$.

This washer being entirely separate from the socket A A', is not required to rotate during the screwing together of the male and female socket, but by said screwing up or tightening of the parts, the flanges $b\ b$ are pressed against the sides of the said washer C, with sufficient force to imbed its annular corrugations into their surfaces by straight compression without any rotating or cutting motion, thereby effecting a perfect joint without removal of the tin surface, when used for the coupling of tin-lined lead pipe.

In the operation of this invention, the socket A A' is unscrewed, and the washer C removed, and one of the parts of the socket is placed over the end of each section of pipe to be coupled, in such manner that their threaded surfaces will be in position for engagement with each other. The flanges $b\ b$ are then formed upon the ends of the pipes. This may be done by any suitable apparatus for the purpose, after which the sections of the socket are caused to slide along the pipe until the shoulders $a\ a'$ rest against the back surfaces of the flanges $b\ b$.

The washer C is then inserted into the female socket A', so that one of its corrugated sides will rest against the face of the flange contained within the said socket. This being done, the sections A A' are united and screwed together until sufficiently tight to establish a perfect joint.

This pipe-coupling, as also its interposed washer C, may be of any desirable length, and the said washer may have a side opening, of sufficient size and suitably threaded for reception of a branch pipe, in which case a corresponding opening is also made through the socket, for the passage of the branch pipe to the washer.

What I claim as my invention, and desire to have secured by Letters Patent, is—

The hard-metal washer C, having annular grooves or corrugations in its face or faces, in combination with the male and female socket A A', for the coupling of soft-metal pipes, in the manner substantially as set forth.

JOHN VIVIAN JEPSON.

Witnesses:
FRED. HAYNES,
HENRY PALMER.